No. 12,251. REISSUED JULY 26, 1904.

D. F. SULLIVAN.

KNITTING MACHINE.

APPLICATION FILED JAN. 13, 1904.

3 SHEETS—SHEET 1.

Witnesses:
John F. C. Brinkerhoff
Farnum F. Dorsey

Inventor:
Daniel F. Sullivan
by his Attorneys
Phillips Van Everen & Fish

No. 12,251. REISSUED JULY 26, 1904.

D. F. SULLIVAN.

KNITTING MACHINE.

APPLICATION FILED JAN. 13, 1904.

3 SHEETS—SHEET 2.

Witnesses:

John F. B. Prinkerh

Farnum F. Dorsey

Inventor:

Daniel F. Sullivan by his Attorneys

Phillips Van Santvoord & Fish

No. 12,251. REISSUED JULY 26, 1904.

D. F. SULLIVAN.

KNITTING MACHINE.

APPLICATION FILED JAN. 13, 1904.

3 SHEETS—SHEET 3.

Witnesses:

John F. C. Preinkert

Fermeum F. Dorsey

Inventor:

Daniel F. Sullivan by his Attorneys

Phillips Kew Evarts & Fish

No. 12,251. Reissued July 26, 1904.

UNITED STATES PATENT OFFICE.

DANIEL F. SULLIVAN, OF LOWELL, MASSACHUSETTS, ASSIGNOR, BY DIRECT AND MESNE ASSIGNMENTS, TO THE LAWRENCE MANUFACTURING COMPANY, OF LOWELL, MASSACHUSETTS, A CORPORATION OF MASSACHUSETTS.

KNITTING-MACHINE.

SPECIFICATION forming part of Reissued Letters Patent No. 12,251, dated July 26, 1904.

Original No. 703,973, dated July 1, 1902. Application for reissue filed January 13, 1904. Serial No. 188,916.

*To all whom it may concern:*

Be it known that I, DANIEL F. SULLIVAN, a citizen of the United States, residing in Lowell, in the county of Middlesex and State of Massachusetts, have made a certain new and useful Invention in Knitting-Machines; and I declare the following to be a full, clear, and exact description of the invention, such as will enable others skilled in the art to which it appertains to make and use the same.

This invention relates to knitting-machines, more specifically to striping attachments for circular spring-needle knitting-machines, and comprises improved mechanism for guiding, cutting, holding, and releasing the yarns to change the stripe and to regulate the length of the "lap" or "joining" when a new thread is introduced to insure the new yarn being caught by the loop-wheel and needles before the yarn being knit is thrown out of action and to avoid making a hole at the point where the yarns are changed and to operate the opening and closing of the shears and the guiding and severing of the yarn by positive means.

Figure 1:
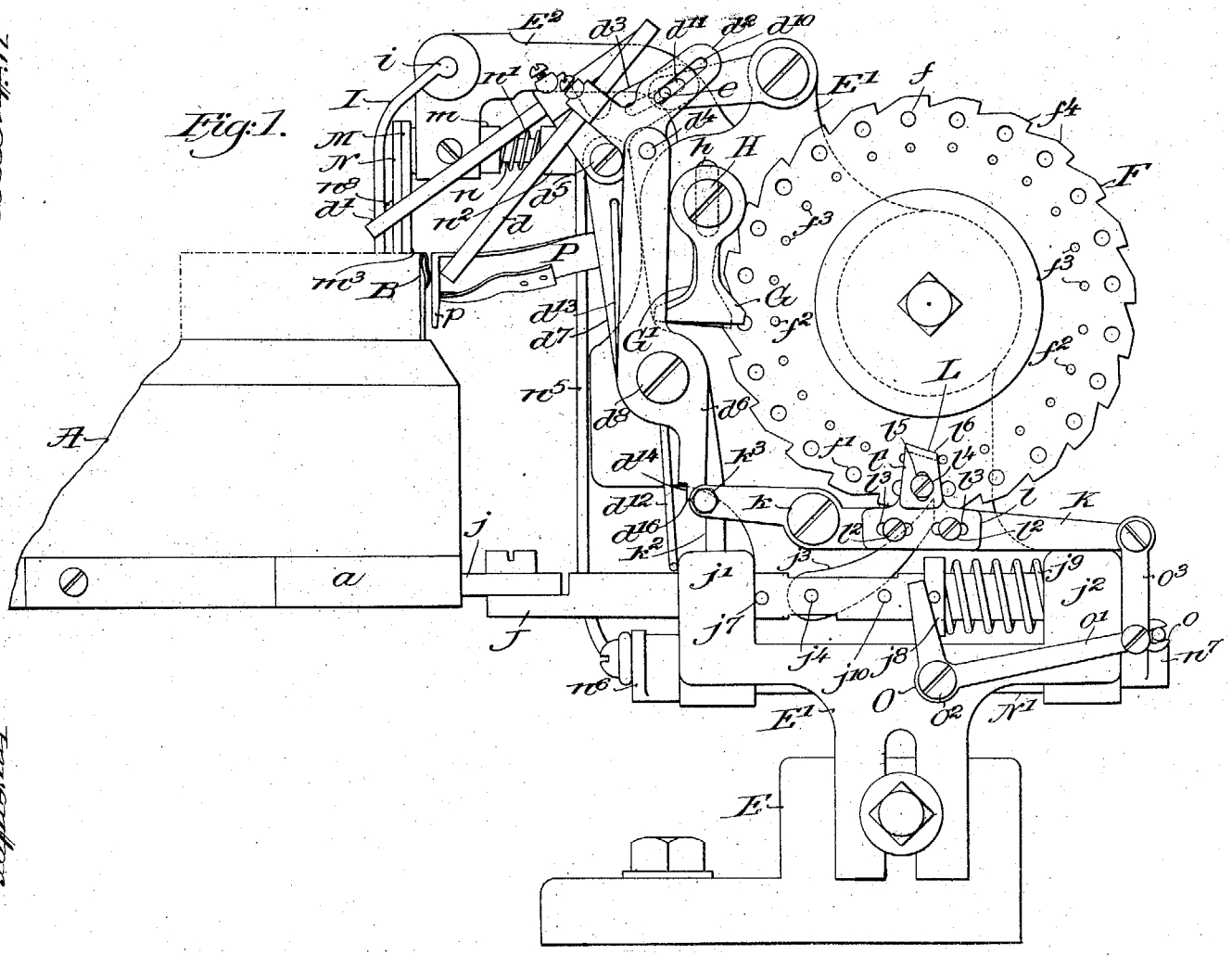
Figure 2:
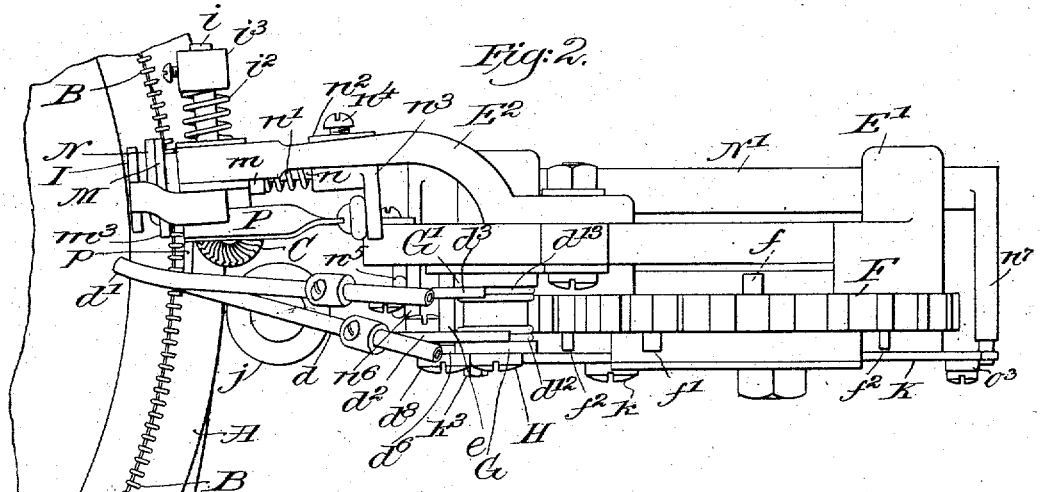
Figure 7:
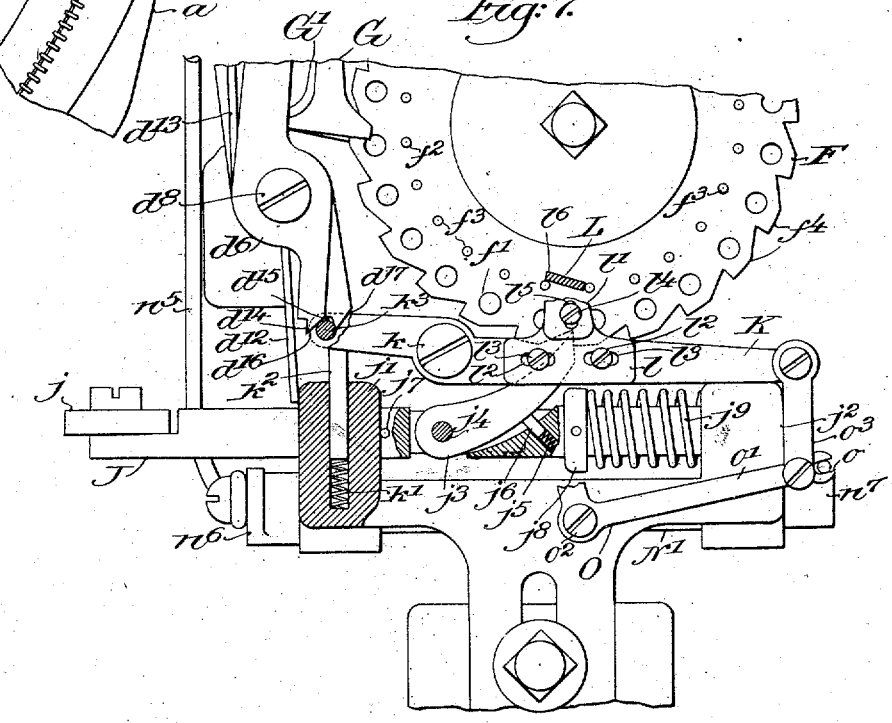
Figure 3:
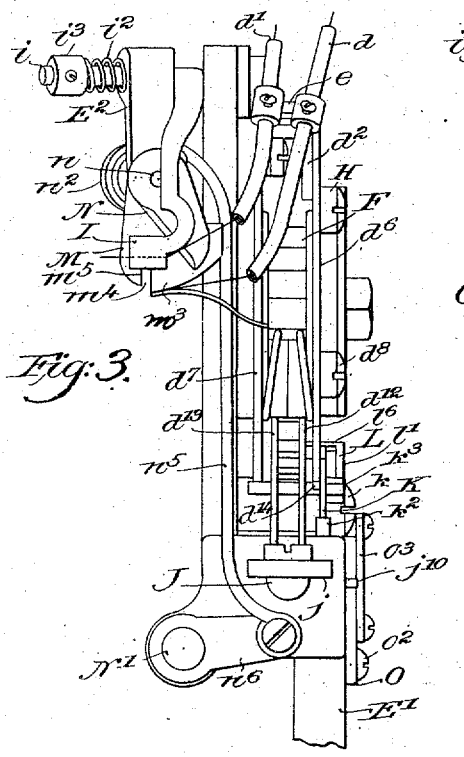
Figure 4:
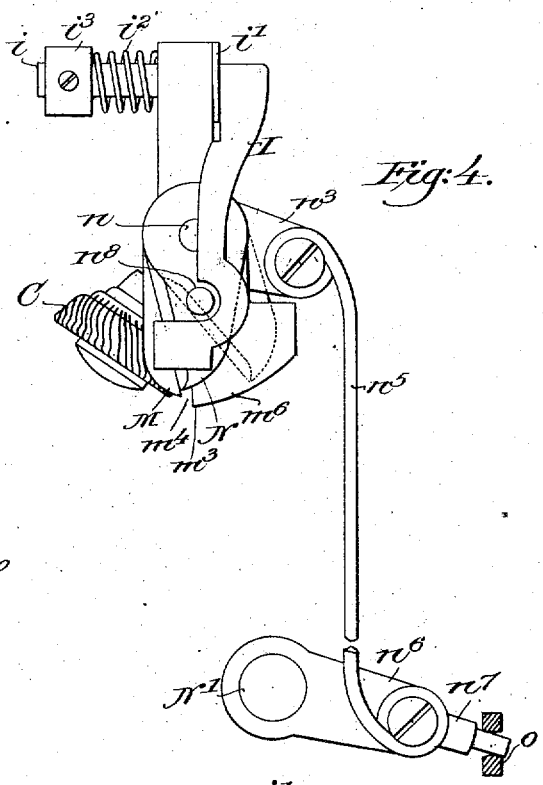
Figure 5:
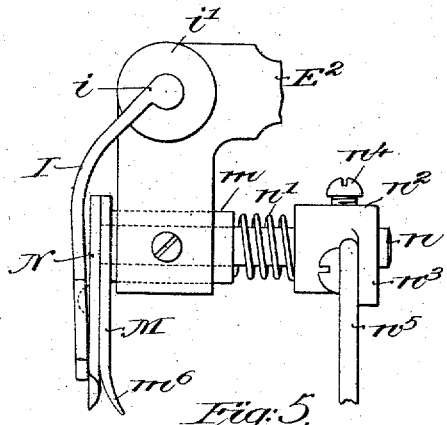
Figure 6:
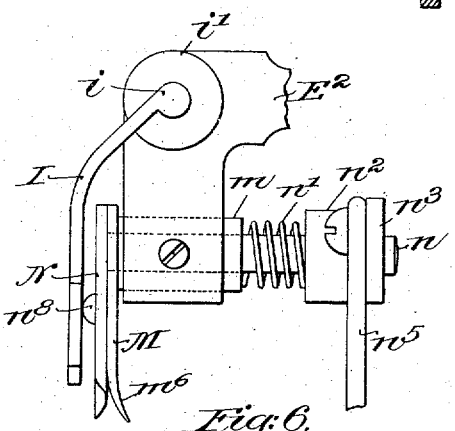

In the accompanying drawings on three sheets, Figure 1 is a right-side elevation of a part of the cylinder and needles of a circular spring-needle knitting-machine with my improvement attached thereto; Fig. 2, a plan of the same; Fig. 3, a front elevation of said improvement; Fig. 4, a front elevation of the shears and holder and their supporting and operating parts; Fig. 5, an enlarged right-side elevation of the shears, guide, and closed holder; Fig. 6, same as Fig. 5, except the holder being open; Fig. 7, an enlarged right-side elevation, partly in vertical section, of parts of the devices shown in the right-hand portion of Fig. 1, including the pattern-wheel and immediately-connected parts.

The cylinder A, needles B, and loop-wheel C are of any usual construction and operation and are in practice used with a presser-wheel, landing-wheel, and other well-known parts not necessary to be herein shown or described.

The yarn-guides may be substantially as shown and described in United States Patent No. 668,025, granted February 12, 1901, to my assignee for an improvement in the same class of inventions and are represented as having yarn-tubes $d$ $d'$ mounted on ends of angle-levers $d^2$ $d^3$, which are pivoted at $d^4$ $d^5$ to the upper ends of other levers $d^6$ $d^7$, having their common fulcrums $d^8$ on the upper part E' of a two-part vertically-adjustable stand, the lower part E of which stand is secured on the bed or table which supports the knitting-machine, said angle-levers having at the ends farthest from the tubes $d$ $d'$ slots $d^{10}$ $d^{11}$ to receive a stud $e$, rigidly supported on the stand part E', so that when any angle-lever is carried by the corresponding lever $d^6$ $d^7$ toward the center of the cylinder A the corresponding yarn-tube is lifted over the needles B, substantially as shown and described in said patent, but by a different mechanism hereinafter described.

The upper ends of the levers $d^6$ $d^7$, as herein represented, are normally swung away from the center of the cylinder by the expansion of springs $d^{12}$ $d^{13}$, represented as spring-wires coiled around the fulcrum-stud $d^8$ and each engaging at one end the corresponding lever and at the other that face of the stand which is next the needle-cylinder.

The upper ends of the levers $d^6$ $d^7$ are crowded inward—that is, toward the cylinder—by pattern-pins $f$ $f'$, carried by a rotary pattern-disk F and projecting from the opposite flat faces thereof, striking against swinging cams G G', arranged between said levers and the center of said disk and projecting into the path of said pins on opposite faces of said disk. The said cams both swing on a common fulcrum-stud H, which projects horizontally from the upper stand part E' and which is adjustable by obvious means in the vertical slot $h$ to vary the distance above the fulcrum $d^8$ at which said swinging cams bear upon the levers $d^6$ $d^7$, and consequently to regulate the amount of movement of said levers and of the angle-levers, so that the yarn shall be carried over the needles to the proper distance inside the needle-circle to enable said yarn to go between the holder I and movable shear-blade N, both hereinafter described.

The levers $d^6$ $d^7$ are locked when their upper ends are swung toward the needle-cylinder A by a locking-lever K, pivoted at $k$ on the stand part E′, the inner arm of said lever K being forced upward by a spring $k'$, which presses a push-rod $k^2$ against the under side of said inner arm, the inner end of said lever K carrying a horizontal projection $k^3$, which engages notches $d^{14}$ $d^{15}$ in the lower ends of the levers $d^6$ $d^7$ when said lower ends are swung outward sufficiently. The lower ends of said levers $d^6$ $d^7$ are beveled at $d^{16}$ $d^{17}$ to allow them in their outward movement to ride over the projection $k^3$, depressing the front arm of the lever K, which immediately after is raised by the spring $k'$ to lock said levers $d^6$ $d^7$ out of operative position.

Only one of the levers $d^6$ $d^7$ and the corresponding yarn-tube $d$ or $d'$ is in operative position or unlocked at the same time, (the lever $d^6$ and the tube $d$ being represented in this position in Figs. 1, 2, 3, and 7,) except during the short interval when the change from one yarn to the other is being made, during which interval both yarn-tubes are in operative position for a few stitches to make the lap or joining.

The outer arm of the lever K is raised at the proper time by unlocking-pins $f^2$, set in holes $f^3$ in the pattern-disk F, which are shown arranged in a circle concentric with said disk, there being as many such holes $f^3$ as there are teeth in the ratchet $f^4$ on the periphery of said disk. The pattern-disk F is rotated an angular distance measured by one tooth of the ratchet $f^4$ at each revolution of the needle-cylinder A, said cylinder carrying a cam $a$, which strikes an antifriction-roll $j$, vertically journaled in the inner end of a horizontal bar J, which slides longitudinally in suitable bearings $j'$ $j^2$ in the upper stand part E′, forcing said bar J outward. Said bar J carries a pawl $j^3$, pivoted thereto at its lower end at $j^4$ in a slot in the top of said bar and pressed upward by a spring $j^5$, which presses a pin $j^6$ against the under side of said pawl. The inward or return movement toward the cylinder A of the said bar J is accomplished by the expansion of a coiled spring $j^9$ and a collar $j^8$ on said bar, this inward movement being limited by a stop-pin $j^7$, which projects from said bar and strikes against the bearing $j'$.

The outer arm of the lever K has adjustably secured thereto a lifter L, made in two parts $l$ $l'$, the lower, $l$, of which is adjustable longitudinally on said arm, being secured thereto by screws $l^2$, which pass through longitudinal slots $l^3$ in said part $l$ into said arm, and the upper part $l'$ of which is secured in a similar manner to said lower part by a screw $l^4$, which passes through a slot $l^5$ in the part $l'$ into the part $l$, the part $l'$ carrying at its upper end an incline $l^6$, which normally stands in the path of the unlocking-pins $f^2$. When an unlocking-pin $f^2$ passes under the incline $l^6$, the outer arm of the lever K is raised, and the lever $d^6$ or $d^7$, as the case may be, is unlocked and moves under the influence of its spring to throw its yarn-tube into operative position.

The shears, consisting of a fixed blade M and a movable blade N, are supported upon a bracket E², which is secured to or integral with the upper stand part E′, the fixed blade M being rigidly secured to the inner side of a sleeve $m$, which is held by a set-screw in such manner that by slightly turning said sleeve the blade M may be placed at the best angle for receiving the yarn, and by moving said sleeve longitudinally the distance of said fixed blade and of the guide $m^3$ (integral with said fixed blade) from the needles may be so adjusted that said fixed blade and guide will not be struck by the needles, and, on the other hand, that the yarn will be prevented from passing between said blade and the needles without being caught by the shears.

The shape of the combined shear blade and guide M $m^3$ is indicated in the drawings, the same consisting of a plate of metal supported, as above described, and arranged at the inside of the circle of needles and provided with a notch $m^4$, the side of which notch nearest the loop-wheel is beveled on the face nearest the needles to form a knife-edge $m^5$, the lower curved edge $m^6$ at the side of the notch farthest from the knife-edge $m^5$ serving as a guide to direct the yarn thrown out of operation into position to be drawn by the loop-wheel and needles up into said notch, said edge $m^6$ coöperating with the curved outside guiding edge $p$ of a plate P, arranged on the outer side of the needles at the same height and angle with said edge $p$, which presses against and closes the beards of the needles to prevent the yarn thrown into operation from being caught by said beards before entering the loop-wheel. The outer guide is substantially as shown in said previous patent, except that it is adjustably secured on the upper stand part E′ instead of the loop-wheel stand.

The movable blade N is rigidly secured to a shaft $n$, which turns in the sleeve $m$, above mentioned, and is held in contact with the fixed blade by a spring, represented as a spiral spring $n'$, which surrounds the shaft $n$, and is compressed between the end of the sleeve $m$ and the hub $n^2$ of the lever $n^3$, which hub surrounds said shaft and is retained thereon by a set-screw $n^4$, Fig. 5, in an obvious manner. By loosening said screw $n^4$ the lever $n^3$ may be adjusted lengthwise of the shaft $n$ to vary the tension of the spring $n'$ and to compensate for the wear of the blades.

The outer end of the lever $n^3$ is connected by the rod $n^5$ to the free end of another arm or lever $n^6$, fast on the shaft N′, which turns in the stand part E′ and has at its outer end an arm $n^7$, Figs. 4 and 7, the free end of which enters a fork $o$ in the end of the outer arm $o'$ of a bell-crank lever O, pivoted at $o^2$ on the stand part E′. The outer end of the lever K is connected by a link $o^3$ to the arm $o'$ of the lever O, so that when said outer end of said lever K is raised by the above-described action of an unlocking-pin $f^2$ on the lifter L the said arm $o'$ is raised, the shaft N′ is rocked, lifting up the rod $n^5$, and the shears are positively opened at the same time that the lever $d^6$ or $d^7$, as the case may be, is unlocked.

The yarn-holder I is rigidly secured to a shaft $i$, capable of turning slightly in the same bracket $E^2$, which supports the shaft $n$ of the movable blade N, these shafts $i$ and $n$ being at right angles to each other. The shaft $i$ is provided with a broad bearing-flange $i'$, which rests against one face of said bracket $E^2$, and said shaft is surrounded by a spiral spring $i^2$, compressed between the other face of said bracket $E^2$ and an adjustable collar $i^3$, which may be moved longitudinally on said shaft $i$ to vary the compression of said spring and may be turned on said shaft to vary the force of torsion of said spring, the ends of said spring being secured to said bracket and to said collar, respectively, the expansive force of said spring holding the flange $i'$ against the bracket, and the torsional force of said spring causing the lower end of the holder I to press against the movable knife-blade N. The movable knife-blade N is provided with a rounded cam projection $n^8$, which when said blade opens or swings away from the cutting edge $m^5$ of the fixed blade M presses the holder away from said blade, as shown in Fig. 6, and thereby releases the end of the yarn held by said holder against said movable blade as this yarn is thrown into operation and at the same time allows the other yarn thrown out of operation to pass freely between said holder and the said blade N and up into the notch $m^4$.

Although the spring $k'$ may be made strong enough to raise the inner end of the lever K into locking position, I have thought it advisable to use a positive means of restoring said lever to its normal locking position, because of the considerable force required to overcome the friction of the movable blade on the fixed blade and holder and of the shafts $i$ and $n$ in the bracket $E^2$ and of the shaft N′ in its bearings and the resistance of other parts connected with said lever K. I therefore provide the bar J with a pin or projection $j^{10}$, Fig. 1, which strikes the inner arm of the bell-crank lever O when the bar J is moved outward next after the opening of the shears, which restores the lever K to locking position and closes the shears.

The shears are never locked in their closed position. The holder is not locked, but is merely held by its spring against the movable blade and moves outward when the cam projection $n^8$ on said movable blade swings under said holder.

It is to be observed that the movable blade when making its cutting stroke moves in the direction of motion of the thread being cut and also that the cutter and holder are located within, below the tops of, and close to the circle of needles. The length of the piece of yarn extending from the fabric to the shears when the cut is made is short, owing to this location of the cutter and holder.

I claim as my invention—

1. The combination of a fixed blade, a movable blade and a holder, said holder being arranged to engage the movable blade to hold the yarn therebetween and adapted to be opened by a cam projection, with which said movable blade is provided, when said movable blade is opened, said movable blade being normally closed.

2. The combination of a fixed blade, a holder, arranged parallel with said blade, a movable blade, arranged between and in contact with said fixed blade and said holder, means for pressing said holder against said movable blade to hold the yarn therebetween, said blades constituting a pair of shears and said movable blade being provided with a cam projection, to crowd said holder away from the body of said movable blade when said shears are opening to release the yarn and to permit said holder to press against said movable blade when said shears are closed to hold the yarn, said shears being normally closed, and means for opening said shears to receive one yarn and to release another yarn.

3. In a striping attachment for circular-knitting machines, the combination of shears, a pattern-wheel, a needle-cylinder, and positive means actuated by said pattern-wheel for opening said shears, and positive means actuated by said needle-cylinder for closing said shears.

4. The combination of the needle-cylinder and needles, the shears arranged inside and below the tops of the circle of needles and stationary guides arranged opposite each other, one within and the other without said circle, to guide the yarn to the needles and into said shears.

5. The combined fixed blade and guide-piece, provided with a notch, and a movable blade, in combination with a needle-cylinder and needles and another guide, arranged outside of said needles, opposite said first-named guide, said blades and first-named guide being arranged inside of said needles.

6. The combination with the needle-cylinder and needles of yarn-carrying levers, swinging cams to operate said levers, a pattern-wheel adapted to engage said cams, a locking-lever, adapted to engage said first-named levers, to hold them out of operative position.

7. The combination with the needle-cylinder and needles of yarn-carrying levers, swinging cams to operate said levers, a pattern-wheel adapted to engage said cams, a locking-lever, adapted to engage said first-named levers to hold them out of operative position, an incline carried by said locking-lever, unlocking-pins, carried by said pattern-wheel and engaging said incline, to move said locking-lever to unlock said first-named levers, and springs, to restore said first-named levers to operative position.

8. A circular spring-needle knitting-machine, having, in combination, a needle-cylinder, knitting-wheels, a plurality of yarn-guides, means for throwing one yarn-guide into and another out of operative position by carrying the former from a point within to a point without and the latter from a point without to a point within the circle of the needles, a yarn-cutter for severing the yarn thrown out of operation, located within, below the tops of, and close to the circle of the needles, and means for actuating the cutter to make its cutting stroke in the direction of motion of the thread being cut, substantially as described.

9. A circular spring-needle knitting-machine, having, in combination, a needle-cylinder, knitting-wheels, a plurality of yarn-guides, means for throwing one yarn-guide into and another out of operative position, a yarn-cutter for severing the yarn thrown out of operation, located within, below the tops of, and close to the circle of the needles, and means for actuating the cutter to make its cutting stroke in the direction of motion of the thread being cut, substantially as described.

10. A circular spring-needle knitting-machine, having, in combination, a needle-cylinder, knitting-wheels, a plurality of yarn-guides, means for throwing one yarn-guide into and another out of operative position, a yarn-cutter for severing the yarn thrown out of operation, and means for actuating the cutter to make its cutting stroke in the direction of motion of the thread being cut, substantially as described.

11. A circular spring-needle knitting-machine, having, in combination, a needle-cylinder, knitting-wheels, a plurality of yarn-guides, means for throwing one yarn-guide into and another out of operative position by carrying the former from a point within to a point without and the latter from a point without to a point within the circle of the needles, a yarn-cutter for severing the yarn thrown out of operation located within the circle of the needles and opposite the loop-wheel, and means for actuating the cutter to make its cutting stroke in the direction of motion of the thread being cut, substantially as described.

12. A circular spring-needle knitting-machine, having, in combination, a needle-cylinder, knitting-wheels, a plurality of yarn-guides, means for throwing one yarn-guide into and another out of operative position, a shears consisting of a stationary blade located within and close to the circle of the needles and opposite the loop-wheel and a movable blade coöperating therewith, and means for actuating the movable blade to make its cutting stroke in the direction of motion of the thread being cut, substantially as described.

13. A circular spring-needle knitting-machine, having, in combination, a needle-cylinder, knitting-wheels, a plurality of yarn-guides, means for throwing one yarn-guide into and another out of operative position, a shears consisting of a stationary blade located within and close to the circle of the needles and opposite the loop-wheel and a movable blade coöperating therewith, means for actuating the movable blade to make its cutting stroke in the direction of motion of the thread being cut, and a thread-holder located adjacent to the shears, substantially as described.

14. A circular spring-needle knitting-machine, having, in combination, a needle-cylinder, knitting-wheels, a plurality of yarn-guides, means for throwing one yarn-guide into and another out of operative position, and a yarn cutter and holder located within, below the tops of and close to the circle of needles and opposite the loop-wheels, substantially as described.

15. The combination with a fixed blade, of a movable blade and a holder adapted to coöperate with said movable blade to hold the end of the severed yarn, said movable blade and holder having coöperating cam-surfaces acting to open the holder when said movable blade is opened, substantially as described.

16. A circular spring-needle knitting-machine, having, in combination, yarn-changing devices, a yarn-cutter consisting of a fixed blade located within, close to and below the tops of the circle of the needles opposite the loop-wheel and a movable blade coöperating therewith, and a yarn-holder adapted to engage the movable blade and hold the end of the severed yarn thereagainst, substantially as described.

17. A circular spring-needle knitting-machine, having, in combination, yarn-changing devices, inside and outside guides to guide the yarns to and from the needles, a thread-holder, and a cutter for severing the yarn, said holder and cutter being located within, below the tops of and close to the circle of the needles, substantially as described.

18. A circular spring-needle knitting-machine, having, in combination, a needle-cylinder, knitting-wheels, a plurality of yarn-guides, means for throwing one yarn-guide into, and another out of, operative position, operating to move the delivery ends of the yarn-guides from their operative to their inoperative positions over the tops of the needles along a path of such form that the operative and inoperative positions are on a straight line passing beneath the position occupied by the delivery ends of the yarn-guides at the time they are passing over the needles, substantially as described.

19. A circular spring-needle knitting-machine, having, in combination, a needle-cylinder, knitting-wheels, a plurality of yarn-guides, means for throwing one guide into, and another out of, operative position, operating to move the delivery ends of the yarn-guides upwardly and inwardly from their operative positions over the tops of the needles and thence inwardly at an angle to the former path of motion to their inoperative positions, substantially as described.

In testimony whereof I have hereunto affixed my name.

DANIEL F. SULLIVAN.

Witnesses:

FARNUM F. DORSEY,
HORACE VAN EVEREN.